United States Patent [19]
DiIorio et al.

[11] Patent Number: 5,899,412
[45] Date of Patent: May 4, 1999

[54] AIRCRAFT PRESSURE CONTAINMENT ASSEMBLY MODULE

[75] Inventors: George D. DiIorio, Dix Hills; Kenneth P. Grube, N. Merrick; Michael H. Reinhardt, Huntington, all of N.Y.

[73] Assignee: Northrop Grumman Corporation, Los Angeles, Calif.

[21] Appl. No.: 08/995,124

[22] Filed: Dec. 19, 1997

[51] Int. Cl.⁶ ............................................... B64C 1/10
[52] U.S. Cl. .................................................. 244/119
[58] Field of Search ......................... 244/117 R, 119, 244/121, 131, 133, 125; 220/592, 668, 646

[56] References Cited

U.S. PATENT DOCUMENTS

| | | | |
|---|---|---|---|
| 1,669,592 | 5/1928 | Arnstein | 244/125 |
| 2,192,239 | 2/1940 | Rethel et al. | 244/117 R |
| 5,086,996 | 2/1992 | Roeder et al. | 244/119 |

FOREIGN PATENT DOCUMENTS

| | | | |
|---|---|---|---|
| 455352 | 7/1913 | France | 244/119 |

*Primary Examiner*—Galen L. Barefoot
*Attorney, Agent, or Firm*—Terry J. Anderson; Karl J. Hoch, Jr.

[57] ABSTRACT

An aircraft pressure containment module is adapted to be mounted generally transversely within an aircraft fuselage for providing pressure containment to separate pressurized and non-pressurized sections of an aircraft. A plurality of web segments are joined together to form a web member. A ring member is arranged on a first pressurized side of the web member. A plurality of truss assemblies are also arranged on the first side of the web member. Each truss assembly is comprised of a first truss member adapted to extend outwardly from the ring member to a peripheral edge of the web member. The first truss member is joined to the web member and joins together adjacent web segments. A second truss member extends from the first truss member in a direction generally normal to the first side of the web member. The second truss member is adapted to be joined to an aircraft fuselage in a longitudinal sense or it may comprise a portion of longitudinally extending member of the fuselage such as a stringer. A third truss member is joined to the second truss member and the first truss member to form a truss assembly having at least in part a generally triangular shape. The truss assemblies are adapted to react pressure loading from the web member to the fuselage of an aircraft in a manner similar to a conventional dome type pressure containment module. An aircraft using the module has an elongated fuselage extending in a longitudinal direction and the pressure containment module mounted generally transversely within the fuselage.

18 Claims, 4 Drawing Sheets

AIRCRAFT PRESSURE CONTAINMENT ASSEMBLY MODULE

BACKGROUND OF THE INVENTION

1. Field of the Invention

The present invention relates to a novel structure for pressure containment to separate pressurized and non- pressurized sections of an aircraft.

2. Prior Art

U.S. Pat. No. 4,869,443 discloses fuselage sections. U.S. Pat. No. 3,473,761 discloses a pneumatic tubular construction. U.S. Pat. No. 2,090,038 discloses an aircraft structure. U.S. Pat. No. 2,121,670 discloses a metal frame assemblage and a method of construction including convex metal plates. U.S. Pat. No. 2,006,468 discloses an airplane fuselage. U.S. Pat. No. 2,723,092 discloses a radome panel having structurally reinforcing elements. U.S. Pat. No. 4,531,695 discloses a helicopter fuselage with at least one mainframe member having two generally vertical side beams joined by generally horizontal top and bottom beams. U.S. Pat. No. 4,648,570 discloses a system for supporting interior passenger elements within an aircraft. Other U.S. Patents showing airplane fuselage section structures include U.S. Pat. Nos. 2,387,219, 1,885,406, 1,866,534 and 1,622,242. The aforenoted prior art does not disclose a pressure containment structure corresponding to the present invention.

Present day commercial and military transport category aircraft having pressurized cabins/cargo compartments typically utilize metallic concave dome type structures for pressure containment to separate pressurized and non-pressurized sections of the aircraft. These structures are typically located in the aft section of the fuselage just forward of the aircraft's empennage and are attached peripherally to the inside fuselage surface to form a structural boundary. The continuous reinforced shell like construction of the dome uniformly distributes and reacts pressure loads into the fuselage structure itself. This type of construction requires forming of double curvature segments which are assembled to form a concave reinforced shell. Added radial and circumferential straps are incorporated to enhance damage tolerance. Construction and assembly methods are complex. Design of efficient methods attaching the dome to the fuselage while minimizing radial offsets and longitudinal bending stiffness reduction effects add further complexity. In addition, this type of design does not lend itself to the reaction of planar loading such as that which would occur from a rear fuselage mounted engine attachment.

SUMMARY OF THE INVENTION

In accordance with this invention an innovative pressure containment module can provide the structural efficiency of the prior art dome approach for reacting pressure loading while at the same time simplifying manufacture and assembly. The module of this invention also offers the added benefit of providing a structural foundation for the reaction of planar loadings derived from external or internal attachment of other components including engines and support and/or mission equipment. The design of the module incorporates excellent durability and damage tolerance features including ease of inspection while minimizing secondary structural effects associated with the connection to the fuselage. It is readily repairable and by virtue of its modular construction can be easily retrofitted into aircraft being modified to meet new mission requirements. The module's structural concept is intended to comply with applicable Federal Aviation Administration (FAA) regulations for aircraft certification.

In accordance with one embodiment of the invention the module comprises an aircraft pressure containment module which is adapted to be mounted generally transversely within an aircraft fuselage for providing pressure containment to separate pressurized and non-pressurized sections of the aircraft. The module comprises a plurality of web segments forming a web member having a first side adapted to be exposed to a first pressure and a second side adapted to be exposed to a second pressure less than the first pressure. The peripheral edge of the web member has a desired shape adapted to conform to the inside surface of an aircraft fuselage. A ring member is arranged on the first side of the web member. A plurality of truss assemblies are attached to the web member.

Each truss assembly is comprised of first, second and third truss members. The first truss member is adapted to extend outwardly from the ring member to the peripheral edge of the web member. The first truss member is joined to the web member and joins together adjacent web segments. A first end portion of the first truss member is joined to the ring member. The second truss member is adapted to extend from a second end portion of the first truss member in a direction generally normal to the first side of the web member. The second truss member is joined to the second end portion of the first truss member and to a circumferential frame in the fuselage. The second truss member is adapted to be joined to an aircraft fuselage in a longitudinal sense or it may comprise a portion of a longitudinally extending member of the fuselage such as a stringer. The third truss member is adapted to extend from the second truss member to the first truss member to form a truss assembly having at least in part a generally triangular shape. The third truss member is joined to the first and second truss members.

The greater the number of truss assemblies, the more the pressure differential can be uniformly reacted and the lower the reacting load in each truss assembly. In addition, the strength requirements of the web segments and first radial truss members are reduced. The truss assembly subtended angle with respect to the planar web member is also a consideration. The number of truss assemblies is established in conjunction with the center ring diameter through a structural sizing and tradeoff process involving these factors.

Preferred embodiments of the invention include one or more of the following structural features: (a) the web member is generally planar to provide an improved structural foundation for attachment of equipment or engines; (b) the truss assemblies are arranged to extend radially outwardly from the ring member and are generally equally spaced from one another; (c) the third truss member is adjustable to compensate for fuselage tolerances and is adapted to be under tension whenever a fuselage in which it is installed is pressurized; (d) the diameter of the ring (preferably made up of ring segments 33) is selected to be proportional to the effective diameter of the fuselage in which it is installed and the magnitude of the pressure loading as well as to accommodate the structural loading of other components; (e) the number of truss assemblies is selected to provide substantial uniformity of load reaction; (f) the third truss member has a generally tubular shape with end fittings fastened to each end preferably adapted to be bolted to the respective first and second truss members; and (g) the web segments are generally sector shaped and each web segment has a truss assembly joined to it. The web segments provide for modular construction either inside or outside of an aircraft and provide the module with excellent durability and damage tolerance characteristics as well as crack arrestment capability.

In accordance with another embodiment of the invention an aircraft is provided having an elongated fuselage extending in a longitudinal direction and a pressure containment module as described above mounted generally transversely within the fuselage for providing pressure containment to separate pressurized and non-pressurized sections of the aircraft.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
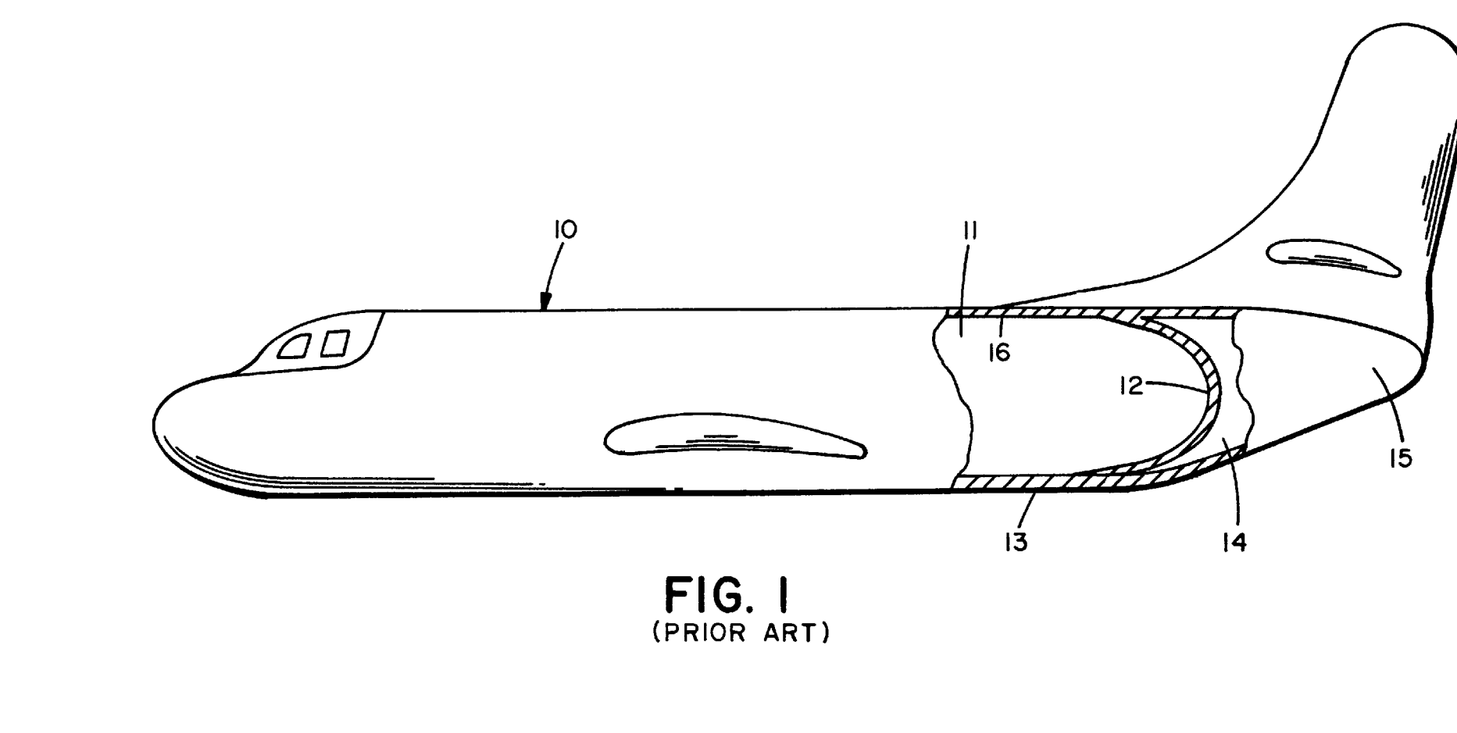
FIG. 1 is a side view of an airplane with a partial cut away sectional view of the aircraft fuselage having a pressure containment module in accordance with the prior art.

Referring to FIG. 1 a typical present day commercial or military transport aircraft 10 is shown having a pressurized cabin or cargo compartment 11. A prior art metallic, concave dome type structure 12 is joined to the fuselage 13 for pressure containment. The dome structure 12 separates the pressurized cabin or cargo compartment 11 from a non-pressurized section 14 of the aircraft 10. These structures 12 are typically located in the aft section of the fuselage 13 just forward of the aircraft's empennage 15 and are attached peripherally to the inside fuselage surface 16 to form a structural boundary. The continuous reinforced shell like construction of the dome structure 12 uniformly distributes and reacts pressure loads into the fuselage 13 structure itself. This type of construction requires forming double curvature segments which are assembled to form a concave reinforced shell type dome structure. Added radial and circumferential straps (not shown) are incorporated to enhance damage tolerance. Construction and assembly methods for this type of dome structure 12 are complex. The methods for attaching the dome structure 12 to the fuselage 13 while minimizing radial offsets and reduction in longitudinal bending stiffness add further complexity. In addition, this type of design does not lend itself to the reaction of planar loading such as would occur from a rear fuselage 13 mounted engine attachment (not shown).

Figure 2:
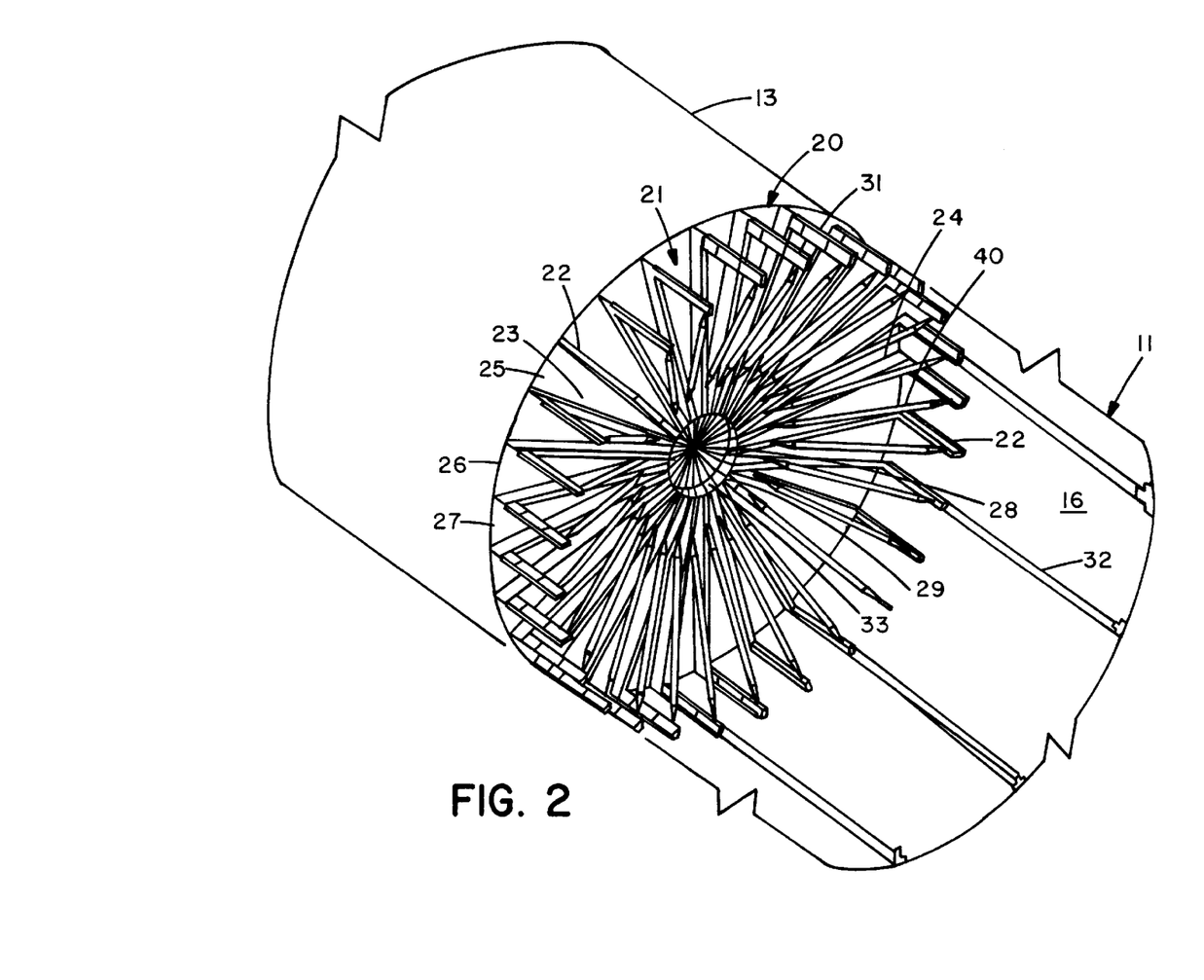
FIG. 2 is a partial perspective view of an airplane fuselage cutaway to show a pressure containment module in accordance with an embodiment of this invention, mounted in the fuselage.

Referring now to FIGS. 1 and 2 in accordance with this invention an innovative pressure containment module 20 is provided which can provide the structural efficiency of the prior art dome structure 12 for reacting pressure loading while at the same time being simple to manufacture and assemble. The module 20 of this invention also offers the added benefit of providing a structural foundation for the reaction of planar loadings derived from external or internal attachment of other components including engines and support and/or mission equipment (not shown). The design of the module 20 incorporates excellent durability and damage tolerance features including ease of inspection while minimizing secondary structural effects associated with the connection of the module 20 to the fuselage 13. It is readily repairable and by virtue of its modular construction can be easily retrofitted into an aircraft 10 being modified to meet new mission requirements. The module 20 structural concept is intended to comply with applicable Federal Aviation Administration (FAA) regulations for aircraft certification.

The innovative aircraft pressure containment module 20 of this invention generally consists of standard aluminum or other alloy components configured as a preferably flat web member 21, continuously supported by a series of three member radial truss assemblies 22 as shown in FIG. 2. The web member 21 comprises a number of segments 23, preferably in the shape of sectors (e.g. pie shaped), which are joined together by the first radial truss members 24. The web member 21 has a first side 25 adapted to be exposed to a first pressure (e.g. pressurized cabin), a second side 26 adapted to be exposed to a second pressure less than the first pressure (e.g. unpressurized aircraft section). A peripheral edge 27 of the web member 21 has a desired shape adapted to conform to the fuselage inside surface 16.

A ring member 28 is arranged on the first side 25 of the web member 21 at a central location and is joined thereto. In the case of a web member 21 with a circular peripheral edge 27 the ring member 28 preferably is arranged substantially coaxially about the center of the web member 21. The ring member 28 can comprise a unitary member or most preferably it is made up of ring segments 33 joined to the web member 21 which when fully assembled provide a complete ring member 28 or it could comprise a combination of such approaches. The ring segments 33 are separate circumferential assemblies consisting of web and flange elements which when joined together constitute the 360-degree ring member 28.

Figures 3, 4:
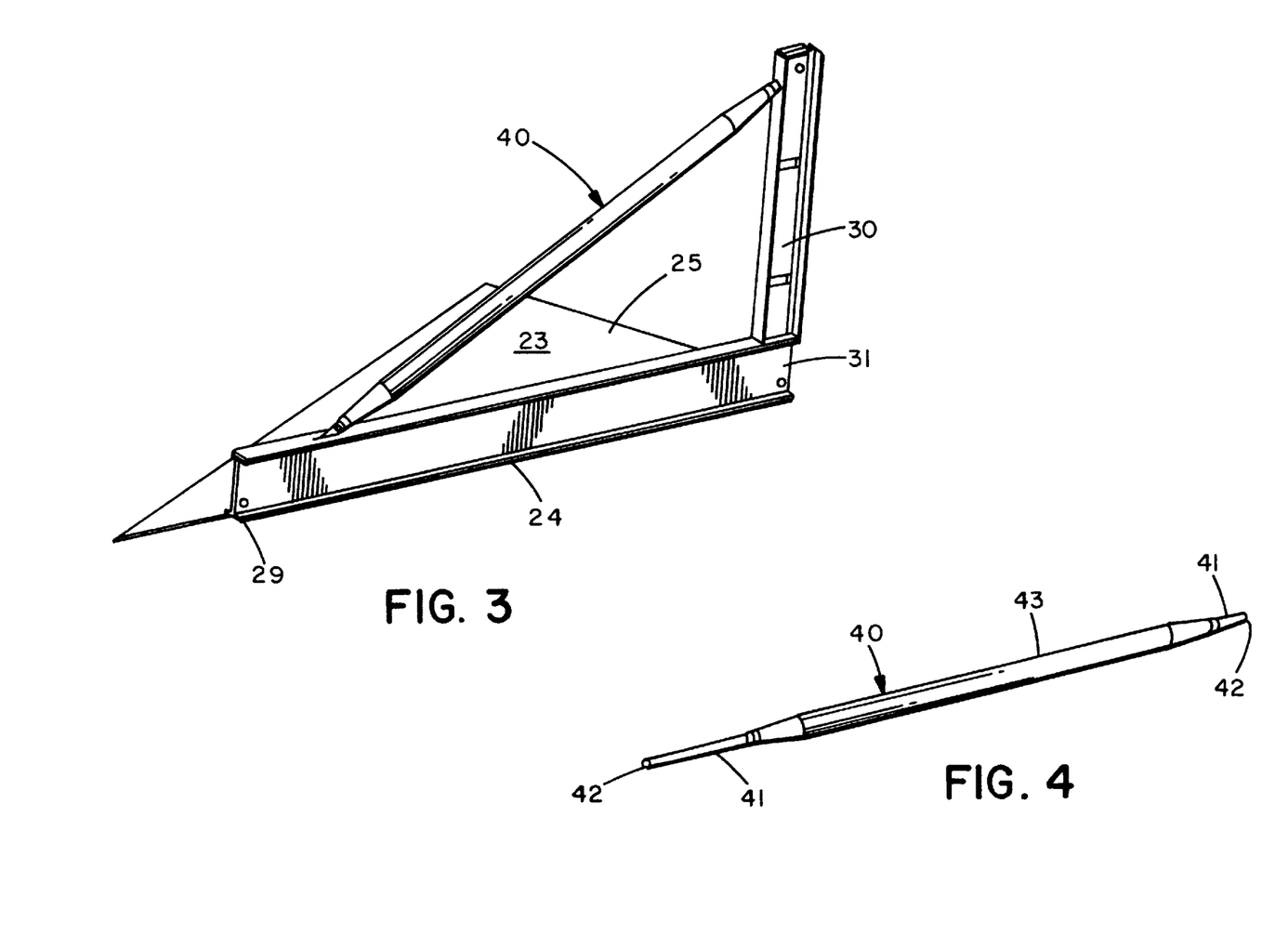
FIG. 3 is an enlarged perspective view of a web segment and truss assembly utilized in the pressure containment module of FIG. 2.
FIG. 4 is a detailed view of a third truss member showing it's the end fittings used for adjustment.

Referring now to FIGS. 2 and 3 the truss assemblies 22 will be described in greater detail.

The truss assemblies are preferably comprised of:

(a) a first truss member 24 which is adapted to extend outwardly (preferably radially) from the ring member 28 to the peripheral edge 27 of the web member 21. The first truss member 24 is joined to the web member 21 and also joins together adjacent web segments 23. Joining in accordance with this invention can comprise any conventional means of joining, including without limitation, riveting, bolting, welding, brazing, or the use of structural adhesives. A first end portion 29 of the first truss member 24 is also joined to the ring member 28;

(b) a second truss member 30 is adapted to extend from a second end portion 31 of the first truss member 24 in a direction generally normal to the first side 25 of the web member 21. The second truss member 30 is joined to the second end portion 31 of the first truss member 24. The second truss member 30 is adapted to be joined to the aircraft 10 fuselage 13 in a longitudinal sense or it may comprise a portion of longitudinally extending member of the fuselage 13 such as a stringer 32; and (c) a third truss member 40 adapted to extend from the second truss member 30 to the first truss member 24 to form a truss assembly 22 having at least in part a generally triangular shape, the third truss member 40 is joined to the first and second truss members 24 and 30.

The preferably substantially flat or planar web member 21 of the module 20 is stiffened by the first radial truss members 24 of the truss assemblies 22. The truss assemblies 22 are adapted to react pressure loading from the web member 21 to the fuselage 13 of an aircraft 10 in a manner similar to a conventional dome type pressure containment module 12. The first truss members 24 react pressure loading from the plane of adjacent web segments 23 to the fuselage 13 and third truss member 40 connections, respectively, thereby simulating the membrane effect that the traditional dome type structure 12 provides. The truss assemblies 22 are installed on the pressurized side 25 of web member 21 within the fuselage 13. Second truss members 30 may also act as stringers 32 depending on their number and location. The third truss members 40 are always under tension when the fuselage 13 is pressurized. The truss assemblies 22 are preferably arranged to extend radially outwardly from the ring member 28 and preferably are substantially equally spaced from one another.

The center ring 28 provides the structural foundation for the truss assemblies 22. Its diameter is determined by the outer diameter of the fuselage 13; the magnitude of the pressure loading caused by pressurizing the cabin 11; and the need to accommodate structural attachment of other components (not shown).

A larger center ring member 28 diameter allows for greater flexibility in its construction but results in less efficiency of the truss assemblies 22. The ideal diameter is approached by consideration of a practical minimum size ultimately derived by analyzing structural requirements of the planar web member 21 and space limitations within the fuselage 13 constraining the angle that the third truss member 40 subtends with respect to the web member 21. Since the preferred subtended angle is 45 degrees, ring diameter and truss geometry considerations are tailored for each specific application.

The number of truss assemblies 22 is also determined by these factors, wherein a practical minimum dictates the efficiency in achieving uniformity of load reaction. The greater the number of truss assemblies 22, the more the pressure differential can be uniformly reacted and the lower the reacting load in each truss assembly 22. In addition, the strength requirements of the web segments 23 and first radial truss members 24 are reduced. The truss assembly 22 subtended angle with respect to the web member 21 is also a consideration as previously indicated. The number of truss assemblies 22 is established in conjunction with the center ring member 28 diameter through a structural sizing and tradeoff process involving the factors cited.

One can perform in a conventional manner a structural sizing trade off analysis using the effective diameter of the fuselage 13 and the magnitude of the pressure loading to quantify the structural efficiency of various ring 28 diameters with respect to the enclosed web 21 portion formed by the ring 28 periphery and the number of truss assemblies 22 that can be practically installed to distribute pressure loading sufficiently so as to achieve a uniform reaction into the fuselage 13. A relationship based on these parameters may be determined by fixing one or more variables such as, for example: (a) the subtended angle of the third truss member 40, (b) the intersection of the third truss member 40 with the first truss member 24, or (c) the desired out of plane stiffness for providing support for loading other than pressure loading.

The diagonal or third truss members 40 preferably are of a simple tubular construction as shown in FIG. 4 with mechanically fastened conventional end fittings 41 adapted to be bolted to the first and second truss members 24 and 30 through holes 42. The third truss members 40 are interchangeable with adjustment features to compensate for fuselage 13 tolerances. Adjustment is provided by means of discrete axial installation positions of the end fittings 41 mounted on each end of the tubular portion 43 of the third truss member 40. These installation positions are determined by quantification of assembly tolerances for the third truss member 40 geometry selected. Each of the end fittings 41 and extremities of the tubular portion 43 of the third truss member 40 are match fitted to achieve these installation positions as defined by the boltholes 42. Selecting the axial length of the respective end fittings 41 results in the ability to vary the length of the third truss member 40 upon installation.

Figure 5:
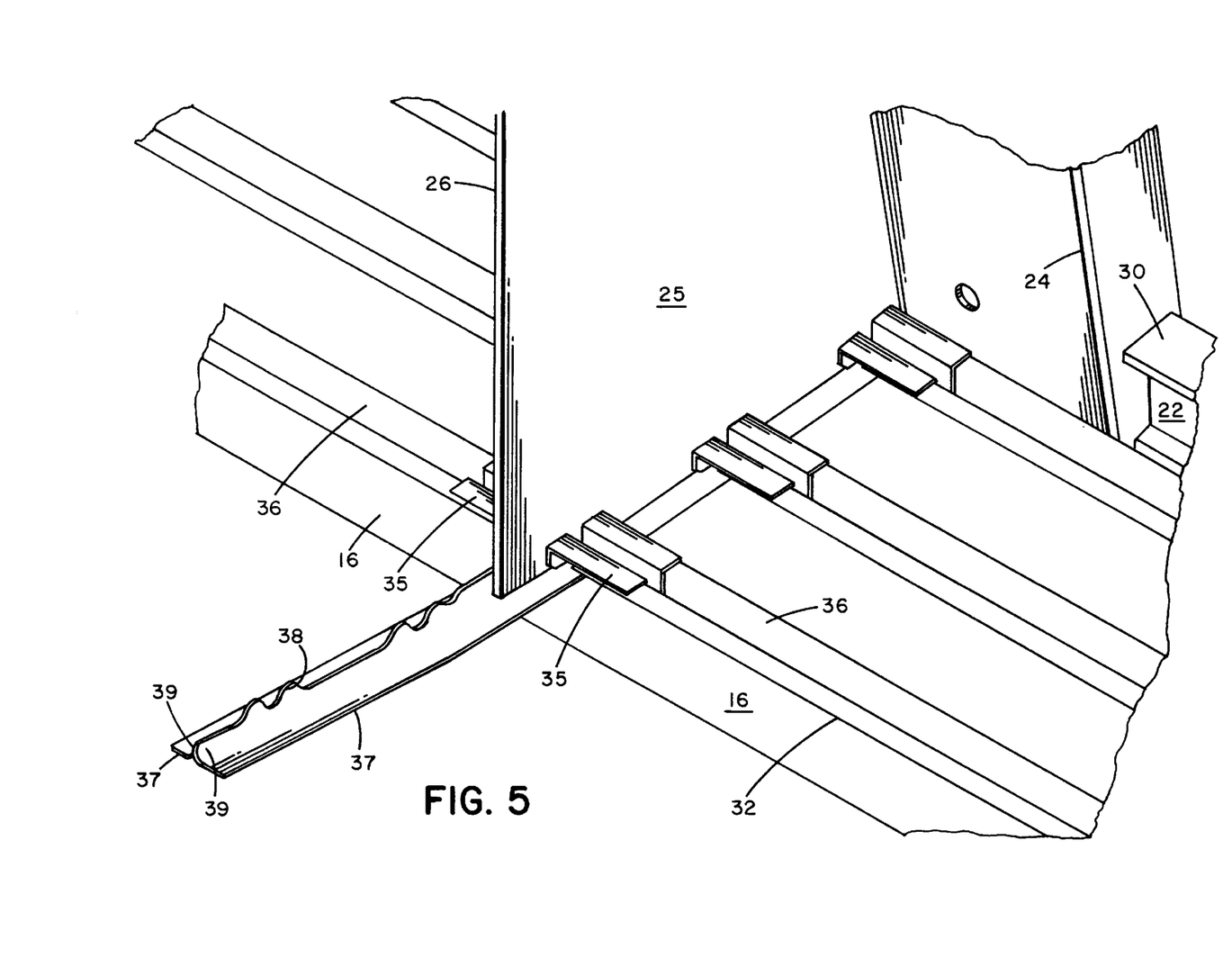
FIG. 5 is a partial perspective view showing in greater detail the mounting of the web and truss assembly to the inside surface of the fuselage.

Referring now to FIGS. 2 and 5, fuselage 13 stringers 32 are spliced at the web member 21 to simplify pressure sealing and installation of the assembly module 20. This is accomplished by utilizing back to back machined splice fittings 35 on either side 25 or 26 of the web member 21 bolted together to mechanically join the stringer 32 to the assembly module 20 interface. The machined splice fittings 35 nest inside the stringers 32 and are mechanically fastened to the stringer web (not shown) and flanges 36. In this manner, the continuity of the web member 21 is retained and the potential for pressure leaks is minimized. Note that while FIG. 5 depicts a stringer having an inverted hat cross-section, any structural cross section suitable for a stringer 32 design could be used and may be spliced by conforming splice fittings 35. The assembly module 20 is sealed to the fuselage 13 by means of an arrangement of separate peripheral edge members 37 aligned and fastened to the outer periphery of the assembly module 20 web member 21. The peripheral edge members 37 or "angles" in turn are fastened to the fuselage 13 inside surface 16. This arrangement provides a float feature for the entire module 20 which facilitates its installation and also provides two sealing surfaces to the fuselage 13, namely, each peripheral edge member 37 attaching flange 38 and a positive pressure sealing surface 26 with respect to the web member 21. Positive fuselage 13 cabin pressure forces the web member 21 against the upstanding joined legs 39 of the peripheral edge members 37 which form the attaching flange 38.

Assembly of the module 20 is modular and can be accomplished either inside the aircraft 10 or outside the aircraft utilizing standard assembly fixtures. Each web segment 23 with its corresponding first truss member 24 and ring segment 33 constitute a subassembly. Ring member 28 construction is based on the use of ring segments 33 preferably having a channel cross-section with one flange (not shown) of the channel attached to the web member 21. The channel portion of the ring segment 33 as shown in FIG. 2 extends in a direction normal to the web member surface 25 and the opposite second channel flange of the web segment (not shown) is free. This arrangement permits the first truss member 24 to be connected to the ring member 28 in a simple splice arrangement wherein web and flanges of each respective ring segment 33 are mechanically fastened to each other with brackets or any other desired means (not shown). The ring member 28 is made up of several segments 33 joined as separate assemblies or it may be fabricated as a single assembly depending on the diameter selected. As individual segments 33, it is possible to fabricate the channel portion of each ring segments 33 as an extrusion formed to the desired radius. The channel cross section (not shown) of the ring member 28 also adds out of plane stiffness to the web member 21 and supports the center section of the web 21.

For assembly outside of the aircraft 101 the web segments 23 are joined together to provide a complete web member 22. Assembly of the module inside of an aircraft 10 involves setting up a locating tool of conventional design (not shown) within the fuselage. The locating tool is positioned on the floor structure of the fuselage 13 and optically aligned. It is assembled and built up from this position and contains fixturing with appropriate indexing features to permit the module 20 web segments 23 to be located inside the fuselage 13 for joining and subsequent attachment to the interior surface 16 of the fuselage 13. The tool itself is portable and can be dismantled and re-assembled for re-use. It is designed to position and hold the web segments 23 to enable the build-up of the module to be self contained inside the fuselage. The tool preferably utilizes a truss type construction with a square framework lined up adjacent to the web 21 plane. The framework preferably contains indexing mounts from which the web segments 23 are positioned and held in the fuselage 13. The assembly of the locating tool consists of hinged and bolted joints allowing the tool to be dismantled and moved in and out of the fuselage through existing openings (i.e. passenger doors, cargo doors). The locating tool concept is adaptable to a full range of aircraft sizes. The individual web sections 23 are positioned and then joined together to form the web member 21. In either approach, the second 30 and third 40 truss members are positioned inside the aircraft 10 for final installation. The locating tool may be of any desired design and does not form part of this invention.

Locating, positioning and final installation incorporate float features to preclude built in stresses and preloading. The web member 21 location and separate attachment to the fuselage 13 by means of the peripheral edge member arrangement 37 and installation adjustment in the diagonal third truss members 40 provides a float capability to accommodate tolerance buildups and the prevention of preloading resulting in undesirable built-in stresses. The peripheral edge member 37 attachment as shown in FIG. 5 allows positioning flexibility, while the third truss member 40 attachment to the second truss member 30 is made after the web member 21 is secured in place. Thus the truss assemblies 22 are installed stress free and independent of the web member 21 installation.

The design is sufficiently flexible to be applicable to a range of aircraft 10 sizes and shapes wherein only dimensioning is affected. Assembly inside the fuselage 13 using a portable locating tool (not shown) provides the option of modifying existing aircraft 10 for new internal fuselage 13 configurations involving separation of pressurized and non-pressurized sections of the fuselage 13. It allows replacement of existing damaged pressure dome structures which may be uneconomical to repair or replace in kind. Since all of the containment module 20 elements are modular and easily built up and assembled from a single locating tool on or off the aircraft, size and weight of the module can be readily accommodated and managed.

By virtue of its modular design and use of discrete web segments 23 and truss assemblies 22, which preferably incorporate common features, the module 20 of this invention has excellent durability and damage tolerance characteristics. Redundancy exists in the number of radial truss assemblies 22 selected. Sectoring of the web member 21 provides crack arrestment capability. Uniformity of load distribution is provided through tooling and assembly techniques and eccentricities are minimized through simple geometry and conventional mechanical connections. Tooling and assembly, by building up the containment module 20 in a sequence that precludes preloads and built-in stresses, ensures that the installed assembly will react applied loads uniformly. In addition, the use of tight tolerance holes and attaching hardware for the truss assembly 22 enhances the ability of the structure to distribute loads uniformly. All joints are designed to be axially aligned using standard clevis arrangements so that no secondary bending effects due to offsets are produced.

Truss members 24, 30 and 40 are readily inspectable because they are discrete and accessible. Overall fuselage 13 stiffness and structural continuity is maintained because the basic fuselage shell 13 is undisturbed. The design lends itself to both new production and retrofit because of the simplicity of its assembly. The web member 21 portion of the module 20 can easily accommodate add on structure (not shown) for equipment mounting, penetrations for systems and their installations as well as external mounting for rear fuselage engine configurations. This would not be possible with conventional pressure dome structures 12. The truss assembly 22 network provides an added stability feature, as well as the ability to react out of plane loads without inducing undesirable secondary effects into the plane of the web member 21, for these add on options.

The pressure containment module 20 of this invention is comparable in weight to the prior art pressure dome configuration 12 while mitigating interface and assembly complexities and without introducing the complex geometry features associated with the dome configuration 12.

The pressure containment module 20 is far superior both in weight and manufacturability to flat pressure bulkheads used where in-plane load reaction structure is required. This is because it combines the efficiency of a dome design 12 for reacting pressure with the in-plane structural members required to accommodate planar loads. Reparability of the module 20 is enhanced because of its modular construction and the use of discrete truss assemblies 22, simple parts and subassemblies. No special tools are required and on-aircraft repair can be readily accomplished.

In summary, the module 20 of this invention is lightweight, modular and retrofitable. It is compliant with FM aircraft certification requirements for structural integrity. The module 20 is readily inspectable and repairable. It minimizes structural complexities associated with geometry, eccentricities, assembly and installation in an aircraft 10. The module 20 accommodates other structural applications such as mission equipment mounting, engine supports, system penetrations and installations, etc. It is a viable alternative to both traditional pressure dome 10 and flat pressure (not shown) bulkhead construction designs.

While the invention has been described in reference to an airplane type of aircraft it is applicable to any desired aircraft having a need to separate higher-pressure portions from lower-pressure portions such as pressurized and unpressurized portions. Such aircraft include helicopters, gliders, missiles, rockets and spacecraft to name a few. While the module 20 has been described with respect to metal or alloy components it could be constructed of any suitable material including fiber composites. While the web member 21 preferably has a circular peripheral edge 27 it can have any desired shape adapted to mate with the inside surface 16 of the fuselage 13. In the case of non-circular web members 21 the ring member 28 is located at the effective center of the web member 21 and the truss assemblies 22 preferably extend radially outwardly therefrom.

It should be understood that the foregoing description is only illustrative of the invention. Various alternatives and modifications can be devised by those skilled in the art without departing from the spirit of the invention. Accordingly the present invention is intended to embrace all such alternatives, modifications and variances which fall within the scope of the appended claims.

What is claimed is:

1. An aircraft pressure containment module adapted to be mounted generally transversely within an aircraft fuselage for providing pressure containment to separate pressurized and non-pressurized sections of an aircraft comprising:
   a plurality of web segments;
   a web member comprised of said web segments, said web member having a first side adapted to be exposed to a first pressure, a second side adapted to be exposed to a second pressure less than said first pressure, and a peripheral edge of desired shape adapted to conform to an inside surface of the fuselage;
   a ring member arranged on said first side of said web member; and
   a plurality of truss assemblies, each said truss assembly comprised of:
   (a) a first truss member adapted to extend outwardly from said ring member to said peripheral edge of said web member, said first truss member being joined to said web member and joining together adjacent web segments and a first end portion of said first truss member being joined to said ring member,
   (b) a second truss member adapted to extend from a second end portion of said first truss member in a direction generally normal to said first side of said web member, said second truss member being joined to said second end portion of said first truss member, said second truss member being adapted to be joined to an aircraft fuselage in a longitudinal sense or it may comprise a portion of longitudinally extending member of said fuselage such as a stringer, and
   (c) a third truss member adapted to extend from said second truss member to said first truss member to form a truss assembly having at least in part a generally triangular shape, said third truss member being joined to said first and second truss members;
   whereby the truss assemblies are adapted to react pressure loading from the web to the fuselage of an aircraft in a manner similar to a conventional dome type pressure containment module.

2. A module as in claim 1 wherein said web member is generally planar to provide an improved structural foundation for attachment of equipment or engines.

3. A module as in claim 2 wherein the truss assemblies are arranged to extend radially outwardly from said ring member and are generally equally spaced from one another.

4. A module as in claim 3 wherein said third truss member is adjustable to compensate for fuselage tolerances and wherein said third truss member is adapted to be under tension whenever a fuselage in which it is installed is pressurized.

5. A module as in claim 3 wherein the diameter of the ring is selected so as to be proportional to: the effective diameter of the fuselage in which it is installed, the magnitude of the pressure loading and to accommodate the structural loading of other components.

6. A module as in claim 3 wherein the number of truss assemblies is selected to provide substantial uniformity of load reaction.

7. A module as in claim 3 wherein said third truss member has a generally tubular shape with end fittings fastened to each end thereof and adapted to be bolted to the respective first and second truss members.

8. A module as in claim 3 wherein said web segments are generally sector shaped.

9. A module as in claim 8 wherein each web segment has a truss assembly joined to it, whereby said web segments provide for modular construction either inside or outside of an aircraft, said web segments providing said module with excellent durability and damage tolerance characteristics as well as crack arrestment capability.

10. An aircraft having an elongated fuselage extending in a longitudinal direction and a pressure containment module mounted generally transversely within the fuselage for providing pressure containment to separate pressurized and non-pressurized sections of the aircraft, said pressure containment module comprising:
   a plurality of web segments;
   a web member comprised of said web segments, said web member having a first side adapted to be exposed to a first pressure associated with the pressurized section of the aircraft, a second side adapted to be exposed to a second pressure less than said first pressure associated with the non-pressurized section of the aircraft, and a peripheral edge of desired shape adapted to substantially conform to the transverse shape of the fuselage;
   a ring member arranged on said first side of said web member; and
   a plurality of truss assemblies, each said truss assembly comprised of:
   (a) a first truss member adapted to extend outwardly from said ring member to said peripheral edge of said web member, said first truss member being joined to said web member and joining together adjacent web segments and a first end portion of said first truss member being joined to said ring member,
   (b) a second truss member adapted to extend from a second end portion of said first truss member in the longitudinal direction of the fuselage, said second truss member being joined to said second end portion of said first truss member, said second truss member being adapted to be joined to the aircraft fuselage or comprising a portion of a longitudinally extending member of said fuselage such as a stringer, and
   (c) a third truss member adapted to extend from said second truss member to said first truss member to form a truss assembly having at least in part a generally triangular shape, said third truss member being joined to said first and second truss members;
   whereby the truss assemblies are adapted to react pressure loading from the web to the fuselage in a manner similar to a conventional dome type pressure containment module.

11. An aircraft as in claim 10 wherein said web member is generally planar to provide an improved structural foundation for attachment of equipment or engines.

12. An aircraft as in claim 11 wherein the truss assemblies are arranged to extend radially outwardly from said ring member and are generally equally spaced from one another.

13. An aircraft as in claim 12 wherein said third truss member is adjustable to compensate for fuselage tolerances and wherein said third truss member is adapted to be under tension whenever the fuselage is pressurized.

14. An aircraft as in claim 12 wherein the diameter of the ring is selected so as to be proportional to: the effective diameter of the fuselage in which it is installed, the magnitude of the pressure loading and to accommodate the structural loading of other components.

15. An aircraft as in claim 12 wherein the number of truss assemblies is selected to provide substantial uniformity of load reaction.

16. An aircraft as in claim 12 wherein said third truss member has a generally tubular shape with end fittings fastened to each end thereof and adapted to be bolted to the respective first and second truss members.

17. An aircraft as in claim 12 wherein said web segments are generally sector shaped.

18. An aircraft as in claim 17 wherein each web segment has a truss assembly joined to it, whereby said web segments provide for modular construction either inside or outside of the aircraft, said web segments providing said module with excellent durability and damage tolerance characteristics as well as crack arrestment capability.

* * * * *